United States Patent
Jiang-Häfner

(10) Patent No.: US 8,760,888 B2
(45) Date of Patent: Jun. 24, 2014

(54) HVDC SYSTEM AND METHOD TO CONTROL A VOLTAGE SOURCE CONVERTER IN A HVDC SYSTEM

(75) Inventor: Ying Jiang-Häfner, Ludvika (SE)

(73) Assignee: ABB Technology AG, Zürich (CH)

( * ) Notice: Subject to any disclaimer, the term of this patent is extended or adjusted under 35 U.S.C. 154(b) by 1422 days.

(21) Appl. No.: 12/306,764

(22) PCT Filed: Jun. 14, 2007

(86) PCT No.: PCT/EP2007/055875
§ 371 (c)(1),
(2), (4) Date: Dec. 29, 2008

(87) PCT Pub. No.: WO2008/000626
PCT Pub. Date: Jan. 3, 2008

(65) Prior Publication Data
US 2009/0279328 A1 Nov. 12, 2009

Related U.S. Application Data

(60) Provisional application No. 60/817,352, filed on Jun. 30, 2006.

(51) Int. Cl.
*H02J 3/36* (2006.01)
*H02J 3/46* (2006.01)

(52) U.S. Cl.
USPC .............................................. 363/35; 363/51

(58) Field of Classification Search
USPC .......... 363/34–35, 37, 65, 50, 51; 361/18, 23, 361/93.1; 307/71, 82, 86, 87
See application file for complete search history.

(56) References Cited

U.S. PATENT DOCUMENTS 1,955,313 A  4/1934  Sauer
(Continued)

FOREIGN PATENT DOCUMENTS

DE  69839168 T2  9/1998
(Continued)

OTHER PUBLICATIONS

Behzad Qahraman et al.; An Electromagnetic Transient Simulation Model for Voltage Sourced Converter Based HVDC Transmission; CCECE; May 2, 2004; pp. 1063-1066.

(Continued)

*Primary Examiner* — Adolf Berhane
*Assistant Examiner* — Nusrat Quddus
(74) *Attorney, Agent, or Firm* — Venable LLP; Eric J. Franklin

(57) ABSTRACT

A method to control a voltage source converter in a HVDC system includes controlling a frequency and a voltage amplitude of an AC voltage generated by the voltage source converter independently of the conditions in an AC network connected to the voltage source converter. The method is performed by a control unit of an HVDC system. The method may form a basis of a method to black start an AC network. The AC network includes transmission lines and is connected to at least two AC power stations. One of the at least two AC power stations is connected via a HVDC system to the AC network.

11 Claims, 5 Drawing Sheets

(56) References Cited

U.S. PATENT DOCUMENTS

| | | | |
|---|---|---|---|
| 3,952,210 A * | 4/1976 | Kanngiesser | 307/82 |
| 4,419,591 A * | 12/1983 | Irokawa et al. | 307/45 |
| 4,459,492 A * | 7/1984 | Rogowsky | 307/82 |
| 4,727,467 A | 2/1988 | Bendl et al. | |
| 5,901,053 A | 5/1999 | Eriksson et al. | |
| 6,141,226 A * | 10/2000 | Halvarsson et al. | 363/35 |
| 6,400,585 B2 | 6/2002 | Jiang-Hafner | |
| 6,411,529 B1 | 6/2002 | Svensson | |
| 8,014,178 B2 * | 9/2011 | Radbrant et al. | 363/35 |

FOREIGN PATENT DOCUMENTS

| | | | |
|---|---|---|---|
| DE | 102004033578 A1 | 2/2006 | |
| EP | 0868003 A1 | 9/1998 | |
| JP | 61227637 A | 9/1986 | |
| JP | 2002034159 A | 1/2002 | |
| JP | 2003-500989 A | 1/2003 | |
| WO | WO-03/026118 A1 | 3/2003 | |

OTHER PUBLICATIONS

Prof. Dr. Hand Glavitsch; Einfluβ der Liberalisierung auf die Versorgungssicherheit in den Stromnetzen bze. Regulungserfordernisse durch die Behörden; Mar. 2004; pp. 1-53.
PCT/ISA/210—International Search Report—Dec. 4, 2007.
PCT/IPEA/409—International Preliminary Report on Paentability—Oct. 2, 2008.
PCT International Preliminary Report on Patentability, issued on Sep. 30, 2008, in connection with PCT Application No. PCT/EP/2007/055875.
Bjarne R. Andersen; "Hybrid HVDC System for Power Transmission to Island Networks", IEEE Transactions on Power Delivery, vol. 19, No. 4, Oct. 2004, pp. 1884-1890.
T. Larsson, et al.; "Eagle Pass Back-to-Back Tie: a Dual Purpose Application of Voltage Source Converter technology"; IEEE, 2001, pp. 1686-1691.
C. Du et al.; "Power-Frequency Control for VSC-HVDC during Island Operation"; The $8^{th}$ IEE International Conference on Conference Paper, 2006, pp. 177-181.

* cited by examiner

HVDC SYSTEM AND METHOD TO CONTROL A VOLTAGE SOURCE CONVERTER IN A HVDC SYSTEM

CROSS-REFERENCE TO RELATED APPLICATIONS

This application claims priority to U.S. provisional patent application 60/817,352 filed 30 Jun. 2006 and is the national phase under 35 U.S.C. §371 of PCT/EP2007/055875 filed 14 Jun. 2007.

TECHNICAL FIELD

The invention relates to a method to control a voltage source converter in a high voltage direct current (HVDC) system and to a HVDC system.

BACKGROUND OF THE INVENTION

A HVDC system comprises a first and second converter station each containing a voltage source converter (VSC) for transferring electric power from a first alternating current (AC) network to a second AC network.

Voltage source converters (VSC) are not only used in high voltage direct current (HVDC) systems, but also for example as Static Var Compensators (SVC). In the HVDC application, the voltage source converter is connected between a direct current (DC) link and an AC network, and in the application as Static Var Compensator, the voltage source converter is connected between a direct voltage source and an AC network. In both these applications, the voltage source converter must be able to generate an AC voltage of the same frequency as that of the AC network. The reactive and the active power flow through the converter are controlled by modulating the amplitude and the phase position, respectively, of the AC voltage generated by the voltage source converter in relation to the voltage of the AC network.

In particular the voltage source converter equipped with series-connected transistors (IGBT) has made it possible to use this type of converter for comparatively high voltages. A pulse width modulation (PWM) is used for control of the generated AC voltage which enables a very fast control of the voltage.

From U.S. Pat. No. 6,400,585, which hereby is incorporated by reference, a control system for voltage control of a converter station in a HVDC system is previously known. The object of the control system is to maintain the voltage of a direct current link within safe operation limits also at abnormal voltage conditions.

The known HVDC system comprises a first and a second converter station each having a voltage source converter connected between a DC link and an AC network on each side of the DC link. A current control system for the converter station has means for control of active power flow between the DC link and the AC network by influencing the phase displacement between the bus voltage in the AC network and the bridge voltage of the voltage source converter. The terms bus voltage and bridge voltage are explained further below. The control system comprises means for generation of a phase change order signal in response to an indication of an abnormal voltage condition at the DC link, and means for influencing the phase position of the bridge voltage in response to said phase change order signal, so as to ensure that the phase displacement between the bridge voltage and the bus voltage will result in an active power flow from the DC link to the AC network. A phase-locked loop means (PLL) ensures that the control system of the converter station works in synchronism with the phase position of the bus voltage of the AC network.

The active power flow into the DC link must be balanced. This means that the active power leaving the link must be equal to the power received by the link Any difference may cause the DC voltage to rapidly increase or decrease. To achieve this power balance one of the converter stations controls the DC voltage. The other converter station thus may control the active power flow of the DC link by controlling the DC current accordingly. Commonly the upstream converter station controls the DC voltage while the downstream converter controls the active power flow.

Restoring power after a wide-area power outage in an AC network or AC grid can be difficult. A plurality of power stations needs to be brought back on-line. Normally, this is done with the help of power from the rest of the grid. In the absence of grid power, a so-called black start needs to be performed to bootstrap the power grid into operation.

To provide a black start, some power stations are typically equipped with small diesel generators which can be used to start larger generators of several megawatts capacity, which in turn can be used to start the main power station generators. Generating plants using steam turbines require station service power of up to 10% of their capacity for boiler feedwater pumps, boiler forced-draft combustion air blowers, and for fuel preparation. It is, however, uneconomic to provide such a large standby capacity at each station, so black-start power must be provided over the electrical transmission network from other stations.

A typical black start sequence based on a real scenario might be as follows:
- A battery starts a small diesel generator installed in a hydroelectric generating station.
- The power from the diesel generator is used to bring the hydroelectric generating station into operation.
- Key transmission lines between the hydro station and other areas are energized.
- The power from the hydro dam is used to start one of the coal-fired base load plants.
- The power from the base load plant is used to restart all of the other power plants in the system including the nuclear power plants.
- Power is finally re-applied to the general electricity distribution network and sent to the consumers.

To restore the power after an outage is not an easy process. Small disturbances are continually occurring while the system is weak and fragile during the restoration process, and the grid will experience different conditions, from a dead network over a variety of weak network conditions to a normal strong AC network. In order to maintain the frequency and voltage stability during the restoring process, an overall coordinated system restoration plan is necessary.

When a converter is connected to an island network with only generation, for instance a windfarm, or only consumption, or the mixture of both, it will be very difficult to predict the active power and reactive power. It will thus be difficult to determine a desired active power $P_{ref}$ and a desired reactive power $Q_{ref}$ and it will be unpractical to control them.

When a converter is connected to a dead electric AC network, i.e., no power supply at all, the above described known control system will fail to work, because there is no AC voltage to synchronize for the PLL, and the current control will not work as the current is determined naturally by the connected load.

When a converter is connected to a very weak electric AC network, i.e., the existing short circuit power in the network is approximately equal to or less than the converter rating, it is very difficult for the above described known control system to maintain the stability, as the weak AC network gives a more oscillating AC bus voltage, which leads to the oscillating of the PLL and current control as both systems use the AC bus voltage as input.

SUMMARY OF THE INVENTION

A first object of the invention is to provide a method and a system to control a voltage source converter in a HVDC link which allow a more stable energization of a dead AC network. A second object is to find a method to black start an AC network, where the method is based on the control method of the voltage source converter.

The first object is achieved by a method and a system. The second object is achieved by a method.

According to the invention the energization of a dead AC network is achieved by controlling the frequency and the voltage amplitude of the generated AC voltage of a voltage source converter in order to operate the voltage source converter as a voltage source generator independently of the conditions in a connected AC network. Opposed to that, the known converter control system controls the current of the voltage source converter and reacts on the operating status of the AC network, as described above. The frequency and voltage control are able to stabilize the voltage and frequency of the generated AC voltage, that is, to enhance the stiffness of the weak AC network.

An HVDC system connecting two AC networks and comprising two voltage source converters is capable when controlled according to the invention to provide a black start when any one of the two AC networks experiences power outage.

The one of the two converter stations which is connected to a functioning power supplying AC network will keep the DC voltage of the HVDC system in nominal value. According to the second aspect of the invention, the other of the two converter stations, which is connected to an AC network without power supply, creates an AC voltage with pre-determined frequency and amplitude. The created AC voltage is then used to energize the transmission lines of the AC network, where the AC network is connected to other power stations. By such AC power support from the HVDC converter station the other power stations can be started. The grid is restored gradually by restarting more power plants and connecting more loads.

An HVDC system containing voltage source converters equipped with the control according to the invention will make the process of restoring the power easy and smooth. Unlike generation units which have inertia and involve a mechanical power control, the VSC equipped with the control according to the invention can be made very fast, as there is no inertia. Due to the fast control, the VSC functions as power slack which keeps the power balance between the generation and consumption, that is, the converter works as a rectifier which delivers power from the AC network to DC side when the power generation is higher than the power consumption, and the converter works as an inverter which delivers power from the DC side to the AC network when the power generation is lower than the power consumption. In this way, the critical issues that have to be considered traditionally in the process of black start and restoration of a grid become less important, which makes the restoration of a grid much easier.

In an embodiment of the invention, a voltage feedback control is provided with an adaptive voltage droop function, which provides control of the AC voltage generated by the voltage source converter and at the same time provides an appropriate reactive power sharing among other reactive power sources in the connected AC network, such as voltage regulating devices. As a result, the adaptive voltage droop function keeps the AC voltage amplitude at a common connection point between the voltage source converter and the AC network very stiff under different operating conditions, from a passive load over a weak AC system with little generation up to a strong AC system with all generations restarted.

In another embodiment of the invention, a phase-locked loop (PLL) means comprises signal generating means for generating a signal which represents the desired frequency and phase angle of the AC voltage to be generated by the voltage source converter, in dependence on the frequency order and desired active power such that the frequency of the connected AC network is kept almost constant. The signal generating means works as an adaptive frequency droop function, accordingly. A small variation of the frequency is needed in order to achieve a good sharing of loads between the other generation units in the connected AC network. The adaptive frequency droop function makes it possible to control the frequency almost constant except for the small variation needed to achieve a good sharing of loads between the other generation units.

Further advantageous embodiments of the invention will become clear from the description of preferred embodiments of the invention.

Simulation of a restoration of a grid has demonstrated that with control equipment according to the invention, stable AC voltage and frequency are obtained under different AC network conditions, from passive load over a weak AC system with little generation up to a strong AC system with all power generation restarted.

BRIEF DESCRIPTION OF THE DRAWINGS

The invention will be explained in greater detail by description of embodiments with reference to the accompanying drawings, which are all schematic and in the form of single line diagrams and block diagrams respectively, and wherein.

DESCRIPTION OF EMBODIMENTS

The block diagrams to be described in the following can be seen both as signal flow diagrams and block diagrams of control equipment. The functions to be performed by the blocks shown in the block diagrams may in applicable parts be implemented by means of analogue and/or digital technique in hard-wired circuits, but preferably as programs in a microprocessor. It shall be understood that although the shown blocks are mentioned as members, filters, devices etc. they are, in particular where their functions are implemented as software for a microprocessor, to be interpreted as means for accomplishing the desired function. Thus, as the case may be, the expression "signal" can also be interpreted as a value generated by a computer program and appearing only as such. Only functional descriptions of the blocks are given below as these functions can be implemented in manners known per se by persons skilled in the art.

Variables appearing in the control equipment shown in the figures, in particular representatives of voltages and currents, are shown in vector form to illustrate their multi-phase character. Vector units are designated with a dash on top ($\bar{x}$).

Parts that are similar to each other and appear in more than one figure are given the same designation numbers in the various figures.

Connecting lines between measured values and blocks as well as between blocks have occasionally been omitted in order not to unnecessarily weigh down the figures. However, it is to be understood that the respective variables appearing at the inputs of some blocks are supplied from the blocks or measurement units where they are generated.

Figure 1:
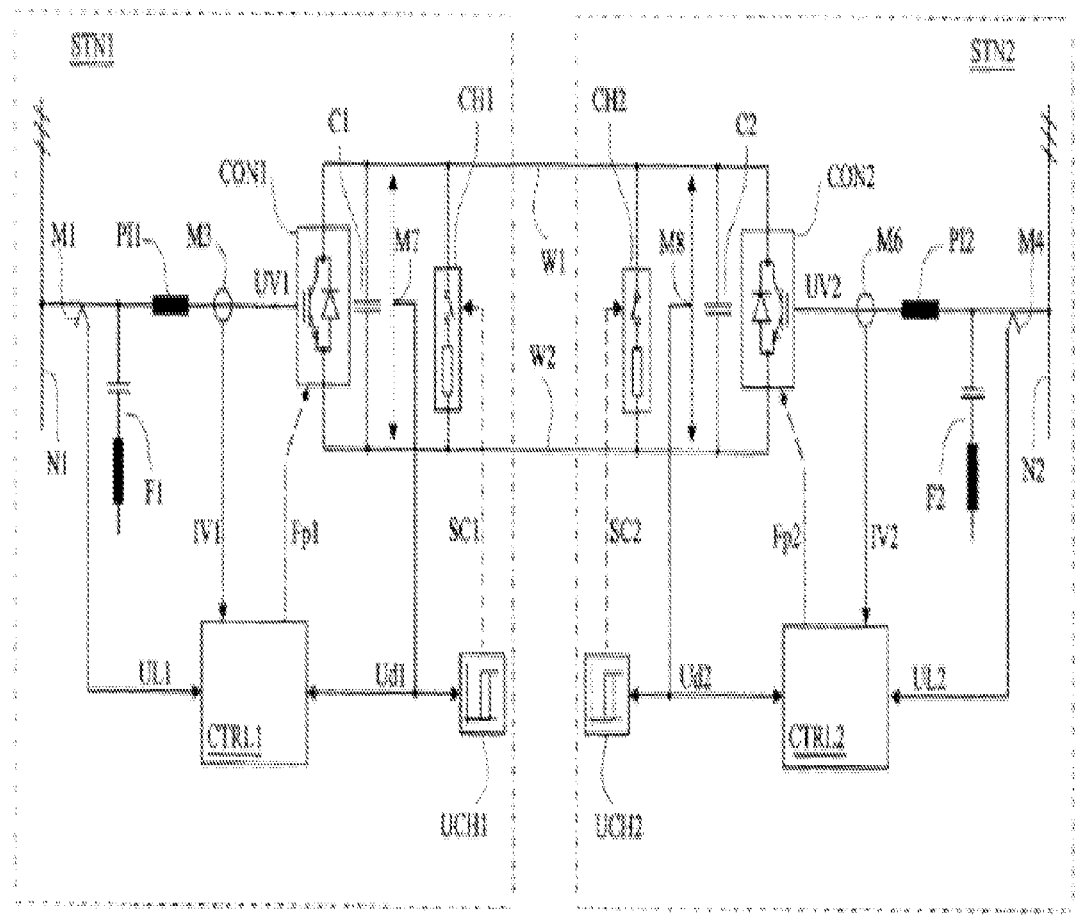
FIG. 1 is a schematic single line and block diagram of a high voltage direct current transmission system as known in the prior art.

FIG. 1 shows in the form of a schematic single line and block diagram a high voltage direct current transmission system as known in the prior art. A first converter station STN1 and a second converter station STN2 are connected to each other by a direct current link having two pole conductors W1 and W2 respectively. Typically, the pole conductors are cables but they may also, at least in part, comprise overhead lines. Each converter station STN1 and STN2 has capacitor equipment, C1 and C2, respectively, connected between the pole conductors W1 and W2, and each converter station STN1 and STN2 comprises a voltage source converter CON1 and CON2, respectively. Each converter CON1 and CON2 comprises semiconductor valves comprising a 2-level or a 3-level converter bridge. The semiconductor valves comprise branches of gate turn-on/turn-off semiconductor elements, for example power transistors of so-called IGBT-type, and diodes in anti-parallel connection with these elements.

Each converter is via a phase inductor PI1 and PI2, respectively, connected to a respective three-phase alternating current electric power network N1 and N2. Although not shown in the figure, it is well known in the art that the converters may be connected to the three-phase network N1 or N2 via transformers, in which case the phase inductors PI1 or PI2 for some cases may be omitted. Filter equipment F1 and F2, respectively, is connected in shunt connection at connection points between the respective phase inductor PI1 or PI2 and the respective three-phase network N1 or N2.

The AC-voltage of the alternating current network N1 at the connection point of the filter F1 is designated UL1 and is measured with a measuring device M1. This voltage UL1 is in the following called the bus voltage of the alternating current network N1. The AC-voltage set up by the converter CON1 is designated UV1 and is in the following called the bridge voltage of the converter CON1. The alternating current at the converter CON1 is designated I1 and is measured with a measuring device M3. Similarly, the AC-voltage at the connection point of the filter F2 is designated UL2 and is measured with a measuring device M4, and the alternating current at the converter CON2 is designated I2 and is measured with a measuring device M6. The AC-voltage at the connection point of the filter F2 is in the following called the bus voltage of the alternating current network N2. The AC-voltage set up by the converter CON2 is designated UV2 and is in the following called the bridge voltage of the converter CON2.

The DC-voltage across the capacitor equipment C1 is designated Ud1 and the DC-voltage across the capacitor equipment C2 is designated Ud2. These voltages are measured with only symbolically shown measuring devices M7 and M8, respectively.

The first converter station STN1 comprises control equipment CTRL1 and the second converter station STN2 control equipment CTRL2, usually of similar kind as the control equipment CTRL1, for generation of trains of turn-on/turn-off orders, FP1 and FP2 respectively, to the semiconductor valves of the respective voltage source converter CON1 or CON2 according to a predetermined pulse width modulation (PWM) pattern.

The converter stations STN1 and STN2 can operate in four different modes, DC-voltage control, active power control, AC-voltage control or reactive power control. Usually, one of the converter stations, for example the first one STN1, operates under DC-voltage control for voltage control of the direct current link, whereas the second converter station STN2 operates under active power control or AC-voltage control or reactive power control. The operation modes are set either manually by an operator, or, under certain conditions, automatically by a not shown sequential control system.

Figure 2:
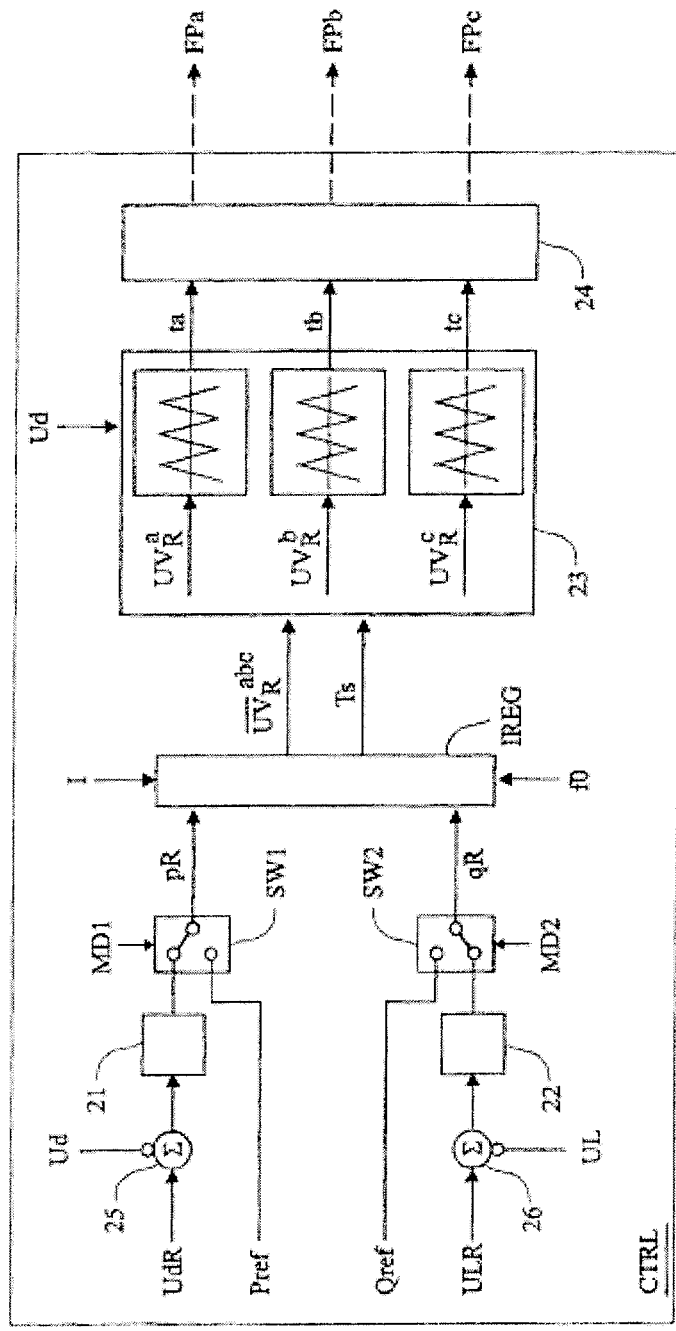
FIG. 2 is an embodiment of the control equipment for a voltage source converter of the prior art transmission system according to FIG. 1.

FIG. 2 shows an embodiment of a prior art control equipment, representative of both the control equipment CTRL1 and the control equipment CTRL2, where the indices 1 and 2 are omitted for sake of simplicity.

The control equipment CTRL comprises a DC-voltage controller 21, an AC-voltage controller 22, selector means SW1 and SW2, a converter current control system IREG, a pulse width modulation unit 23, and a switching logic unit 24.

An actual value of the measured DC-voltage Ud across the respective capacitor equipment (C1 or C2) and a voltage reference value UdR thereof are supplied to a difference forming member 25, the output of which is supplied to the DC-voltage controller 21.

An actual value of the measured respective bus voltage UL and a voltage reference value ULR thereof are supplied to a difference forming member 26, the output of which is supplied to the AC-voltage controller 22.

A first selector means SW1 is supplied with the output signal of the DC-voltage controller 21 and a reference value Pref for the active power flow through the converter. The first selector means SW1 outputs in dependence on a mode signal MD1 a signal pR being either the output signal of the DC-voltage controller 21 or the reference value Pref.

A second selector means SW2 is supplied with the output signal of the AC-voltage controller 22 and a reference value Qref for the reactive power flow through the converter. The second selector means SW2 outputs in dependence on a mode signal MD2 a signal qR being either the output signal of the AC-voltage controller 22 or the reference value Qref.

The AC- and DC-voltage controllers 21 and 22 have for example a proportional-integrating characteristic. The reference values Pref and Qref may in a conventional way be formed as outputs from controllers (not shown) for active and reactive power flow, respectively.

The output signals pR and qR of the first and second selector means SW1 and SW2 are supplied to the converter current control system IREG. The current control system IREG provides an inner AC-current control feed-back loop, which, in dependence on a supplied current reference vector formed in dependence on the output signals pR and qR of the switching means SW1 and SW2 and on a phase reference synchronizing signal, generates a voltage reference template in the form of a voltage reference vector $\overline{UV}_R^{abc}$. This voltage reference vector $\overline{UV}_R^{abc}$ represents the voltage reference for the bridge voltage UV1 or UV2 of the respective converter CON1 or CON2. With the phases of the three-phase alternating current network designated as a, b and c, the upper index abc of the vector refers to the three phase voltages of the converter, and the vector thus has the components $UV_R^a$, $UV_R^b$ and $UV_R^c$.

The converter current control system IREG is also supplied with the actual value I of the alternating current at the converter and with the nominal value f0 of the frequency of the AC network N1 or N2, which is usually 50 or 60 Hz.

The voltage reference vector $\overline{UV}_R^{abc}$ is supplied to the pulse width modulation unit 23 that determines the time instants ta, tb and tc for the commutation of the valves in the respective phase a, b and c of the converter CON1 or CON2, and the switching logic unit 24 generates in dependence thereon a train of turn-on/turn-off orders, FPa, FPb and FPc, supplied to the semiconductor valves.

Preferably, the converter current control system IREG is implemented as software run on a microprocessor and executed as a sampled control system.

For practical reasons, that is for facilitating the calculations, the converter current control system IREG operates in a conventional way, where the three phase units, i.e., voltages and currents of the alternating current network, are transformed to and expressed in a rotating two-phase dq-reference plane, arrived at via a transformation to a stationary two-phase αβ-reference plane. The three phase units of the alternating current network will thereby be transformed to direct current quantities that can be processed with per se known control system techniques.

With the phases of the three-phase alternating current network designated a, b and c, the three-phase system is referred to as the abc-system. In the following text and in the figures, the reference plane is, where appropriate, indicated as an upper index (for example $\bar{x}^{dq}$).

Figure 3:
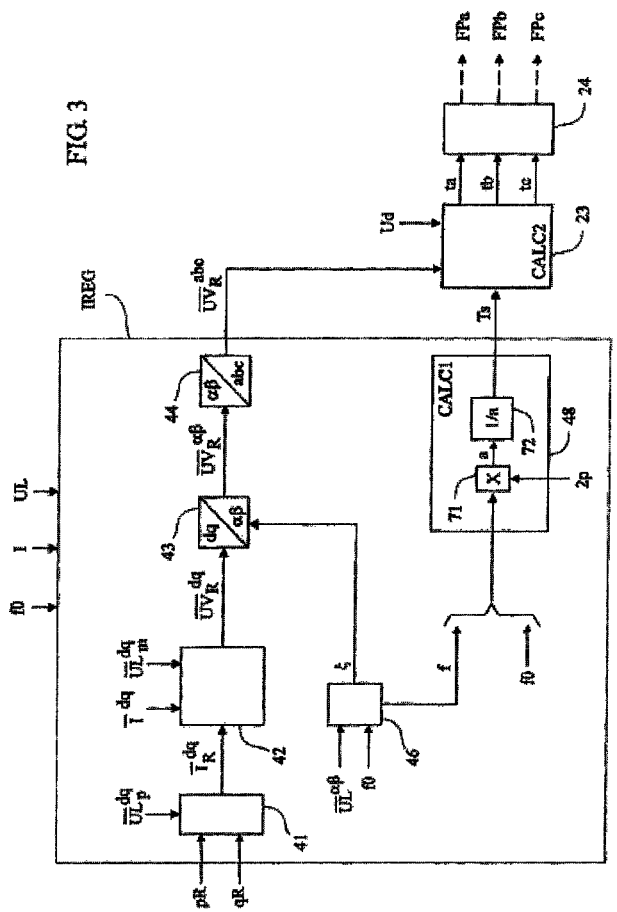
FIG. 3 is a detail part of the prior art control equipment according to FIG. 2.

FIG. 3 illustrates the basic structure of a converter current control system IREG according to prior art. The current control system is implemented as a sampled control system with a sample period time Ts.

For the sake of simplicity, all variables are shown in vector form, but it is understood that the signal processing thereof is performed on the components of the respective vector in a way known per se. As the current control systems are similar for both pieces of control equipment CTRL1 and CTRL2, indices 1 and 2 are, for the sake of simplicity, omitted as indices on the respective variables to be described below.

The converter current control system IREG according to FIG. 3 comprises a current-order calculating unit 41, a current controller 42, a first transformation member 43, a second transformation member 44, a first phase locked loop (PLL) member 46, and a first calculating unit 48.

The converter current control system IREG receives signals pR and qR, generated as explained above with reference to FIG. 2. The signals pR and qR are supplied to the current-order calculating unit 41, which in dependence thereon calculates and outputs reference values for the alternating current at the converter. The reference values are expressed in the dq-reference plane as $I_R^d$ and $I_R^q$ respectively, which are shown in the figure as a current reference vector $\bar{I}_R^{dq} = I_R^d + j I_R^q$. The calculation is performed according to the per se known relations.

$$p_R = UL^d I_R^d + UL^q I_R^q \quad (1a)$$

$$q_R = -(UL^d I_R^q - UL^q I_R^d) \quad (1b)$$

wherein the voltages $UL^d$ and $UL^q$ represent the d- and q-components respectively, of the bus voltage UL, measured in the AC network, and transformed to the dq-reference plane.

The current reference values $I_R^d$ and $I_R^q$ may be limited in accordance with specified operating conditions for the transmission system before further processing.

It is noted that in a dq-reference plane rotating in synchronism with the bus voltage UL as described above with respect to the PLL, the q-component $UL^q$ of the bus voltage UL becomes zero. It then follows from expressions (1a) and (1b) that the d-component $I_R^d$ of the current reference value $\bar{I}_R^{dq}$ becomes a reference value for active power and the q-component $I_R^q$ a reference value for reactive power.

The actual value I of the alternating current is measured in the AC network at the converter and transformed to the dq-reference plane as an actual current vector $\bar{I}^{dq}$.

The current controller 42 is supplied with the current reference vector $\bar{I}_R^{dq}$, the actual current vector $\bar{I}^{dq}$, and with a mean value $\overline{UL}_m^{dq}$ of the bus voltage UL transformed to the dq-reference plane. The current controller 42 outputs in dependence thereon an output signal designated $\overline{UV}_R^{dq}$, which is the voltage reference vector for the bridge voltage of the converter in the dq-reference plane.

The alternating voltage reference vector $\overline{UV}_R^{dq}$ is supplied to the first transformation member 43, transforming the vector to the αβ-reference plane. The output of the first transformation member 43 is supplied to the second transformation member 44, transforming the supplied vector to the abc-reference plane as a vector $\overline{UV}_R^{abc}$. This vector is the bridge voltage reference vector for the converter, having as components voltages reference values for the respective three phases of the alternating current system.

The bridge voltage reference vector $\overline{UV}_R^{abc}$ is supplied to the pulse width modulation unit 23 as described above with reference to FIG. 2.

The first transformation member 43 performs in a way known per se the transformation $\overline{UV}_R^{\alpha\beta} = \overline{UV}_R^{dq} * e^{j\xi}$, with the transformation angle $\xi = \omega t$, the rotational frequency ω of the AC network and the time t.

A transformation angle signal, in the figure designated $\xi$, is in a conventional manner generated by the phase-locked loop (PLL) member 46, in dependence on the nominal value f0 of the frequency of the AC network, and on the phase position of the bus voltage UL, transformed to the αβ-reference plane, and then supplied to the first transformation member 43.

The signal $\xi$ can be conceived of as a phase reference synchronizing signal, in the following shortly referred to as synchronizing signal or phase angle signal. It has the purpose of synchronizing the rotating dq-reference plane with the bus voltage abc-system, and represents an electrical angle linearly increasing with time with a time rate proportional to the actual frequency of the AC network. At least under steady state conditions the synchronising signal $\xi$ is locked to and in phase with the phase position of the bus voltage UL of the AC network. Then, also the rotating dq-reference plane is locked to and maintained in synchronism with the three-phase abc-system and in particular with the bus voltage UL. Under these conditions, also the q-component $UL^q$ of the bus voltage UL becomes zero.

Figure 4:
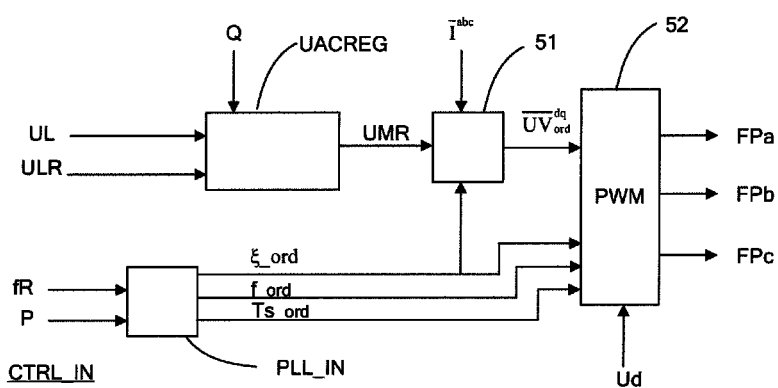
FIG. 4 is an embodiment of converter control equipment according to the invention.

An embodiment of converter control equipment according to the invention is shown in FIG. 4. As compared with the known embodiment of such an equipment as described with reference to FIG. 2 and FIG. 3, control of active power, DC voltage, reactive power and of AC voltage via AC current is replaced by AC voltage control and a new phase-locked loop means. The voltage generating member 51 generates the converter reference voltage $\overline{UV}_{ord}^{dq}$, i.e., the reference value for the bridge voltage of the converter in the dq-reference plane, by using the outputs from an AC voltage control means UACREG and a phase-locked loop means PLL_IN.

The generated converter reference voltage $\overline{UV}_{ord}^{dq}$ together with the outputs from the phase-locked loop means PLL_IN, which include the signals of the desired frequency f_ord and of the desired phase angle ξ_ord of the bridge voltage UV as well as the sampling period Ts_ord, are supplied to a PWM-member 52. For persons skilled in the art it is easily understood that PWM-member 52 may be in one way implemented as shown in FIG. 2 and FIG. 3, or be implemented in another way depending on the selected modulation method.

Figure 5:
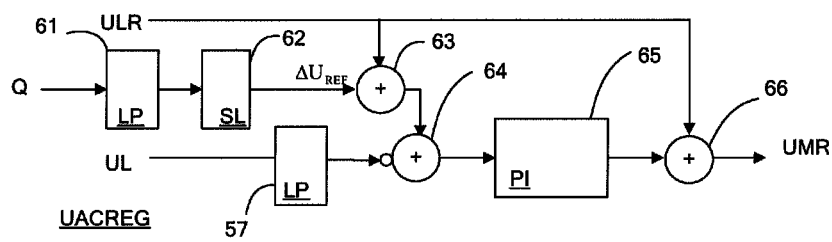
FIG. 5 is an embodiment of AC voltage control means of a converter control equipment according to the invention.

FIG. 5 shows one embodiment of the AC voltage control unit UACREG shown in FIG. 4. The measured reactive power Q at the connection bus to the AC network, N1 or N2 in FIG. 1, is supplied to selection member 62 via filter unit 61. Selection member 62 selects according to the value of the input signal a pre-set constant, and generates a signal ΔUref which is proportional to the selected constant and the input signal. The pre-set constants, known as slope, will enforce an automatic reactive load sharing between the converter station and other voltage regulating devices. The pre-set constants are typically values from 0.01 to 0.1. A higher value is selected if the input signal is high in order to avoid overload currents and to obtain good AC voltage control. A first addition member 63 is supplied with the output from selection member 62 and with the pre-set AC reference voltage ULR. The first addition member 63 outputs the actual AC voltage reference and supplies it to a second addition member 64. Another input signal to the second addition member 64 is the measured AC voltage amplitude UL at the connection bus provided via a filter unit 57. The output of the second addition member 64 is supplied to a regulator 65, which can be of PI-type, i.e., including a proportional part and an integration part. The regulator 65 produces a voltage correction part. This correction part is added with the pre-set AC reference voltage ULR to form a voltage amplitude order UMR.

Figure 6A:
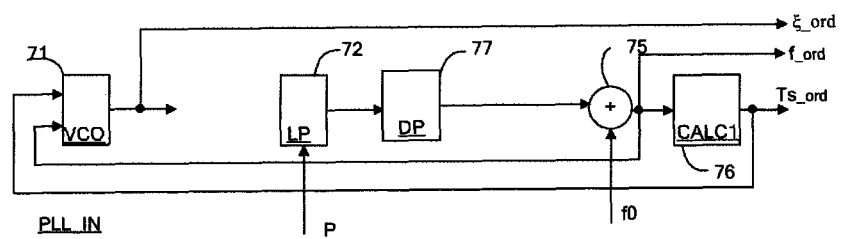
FIG. 6A is an embodiment of a phase-locked loop means of converter control equipment according to an embodiment of the invention and FIG. 6B illustrates the waveform of an output signal of the phase-locked loop means which represents both the desired frequency and phase angle of voltage at a connection point.
Figure 6B:
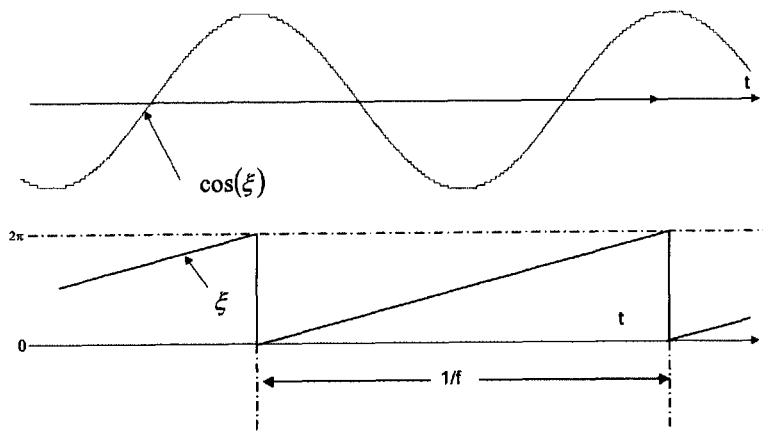

FIG. 6A shows an embodiment of the phase-locked loop member PLL_IN according to FIG. 4. A phase-angle generating unit 71 generates in dependence on the desired frequency f_ord of the bridge voltage UV and on the sampling period Ts_ord a desired phase angle ξ_ord of the bridge voltage UV, the waveform of which is illustrated in FIG. 6B. The desired frequency, which also is the actual frequency of the connected AC network, is the sum of the pre-set reference frequency f0 and a frequency correction part, and resulted from a third addition member 75. A selecting member 77 selects according to the value of the input signal a pre-set constant, and generates a signal which is proportional to the selected constant and the input signal. The pre-set constants, known as droop, enforce automatic active load sharing between the converter station and other power generation units. The pre-set constants are typically values from 0.1 to 1.0. A higher value is selected if the input signal is high in order to avoid over load current and to obtain good frequency control. The input signal of selecting member 77 is the measured active power P which is provided via a filtering unit 72. The sample period Ts_ord is determined by $$Ts\_ord = (2 \cdot p \cdot f)^{-1}$$

where p is a pre-selected number which depends on the switching frequency.

As described above, in the known control system the output signal ξ of the PLL represents the synchronism between the PLL and the measured bus voltage UL. In other words, the signal ξ represents the phase angle as well as the frequency of the AC network voltage. As a result of this synchronism, the dq-reference plane is also rotating in synchronism with the bus voltage UL, which results in that the q-component $UL^q$ of the bus voltage UL becomes zero and the d-component $UL^d$ of the bus voltage UL becomes equal to the amplitude of bus voltage. It should be noticed that this synchronism is realized by a feedback control. In the invention, instead of using feedback control, an enforcing synchronism between the signal ξ_ord of PLL_IN and the bus voltage is realized in voltage generating member 51 (FIG. 4) by setting the q-component $UL^q$ of the bus voltage to zero and the d-component $UL^d$ of the bus voltage to the voltage amplitude order UMR, that is, $$\overline{UL}_{ord}^{dq} = UMR + j \cdot 0 \tag{2}$$

Furthermore, the converter reference voltage in dq-reference plane is obtained as, $$\overline{UV}_{ord}^{dq} = \overline{UL}_{ord}^{dq} + \Delta \overline{U}^{dq} \tag{3}$$

where $\Delta \overline{U}^{dq}$ is the predicted voltage drop across the inductance, and it is obtained by using the dq-component of measured current $\overline{I}^{abc}$ including a filtering process.

The converter reference voltage $\overline{UV}_{ord}^{dq}$ in the control method and system according to the invention corresponds to the voltage reference vector $\overline{UV}_R^{dq}$ in the prior art, referred to in FIG. 3. Similarly, signals ξ_ord, f_ord and Ts_ord according to the invention correspond to signals ξ, f and Ts in the prior art, respectively. As soon as those signals are produced, the generation of switching order for controlling valves can be implemented.

In an embodiment of the invention, the voltage source converter can be equipped with both the control mode known in the prior art called a first control mode, i.e., active power/DC voltage and reactive power/AC voltage control via AC current control, and the control mode according to the invention called a second control mode, i.e., direct AC voltage and frequency control. A software or hardware switch is added to choose the desired control mode.

In a HVDC transmission or back-to-back system, only one of the voltage source converters may be equipped with the control according to the invention. In this case the other converter will use the control known in the prior art in order to control the DC voltage of the HVDC system.

The invention claimed is:

1. A method to control an HVDC system connecting two AC networks, wherein a first of the two AC networks is without a power supply and a second of the two AC networks is functioning, wherein the HVDC system comprises two converter stations each having a voltage source converter, the method comprising:
    operating the voltage source converter of a first of the two converter stations which is connected to the AC network without power supply as a voltage source generator by controlling the voltage source converter of the first converter station to create an AC bridge voltage with a desired frequency and a desired voltage amplitude ($\overline{UV}_{ord}$) using a direct AC voltage and frequency control by controlling a frequency and an amplitude of the AC bridge voltage; and
    controlling a second of the two converter stations which is connected to the functioning AC network to keep the DC voltage of the HVDC system in nominal value.

2. The method according to claim 1, further comprising:
    realizing an enforcing synchronism between a desired phase angle of the AC bridge voltage and the AC bus voltage in the converter station connected to the AC network without power supply.

3. The method according to claim 2, wherein the enforcing synchronism is realized by setting a q-component of the AC bus voltage to zero and a d-component of the AC bus voltage to a voltage amplitude order, so that a reference value for the bridge voltage in a dq-reference plane becomes:

$$\overline{UV}_{ord}^{dq} = UMR + j \cdot 0 + \Delta \overline{\Delta U}^{dq},$$

where $\overline{UV}_{ord}^{dq}$ is the reference value for the bridge voltage in a dq-reference plane, UMR is the voltage amplitude order and $\overline{\Delta U}^{dq}$ is a predicted voltage drop.

4. The method according to claim 1, further comprising:
controlling the voltage amplitude of the AC bridge voltage via a voltage feedback control comprising an adaptive voltage droop function, wherein the adaptive voltage droop function reacts on a reactive power measured at a connection point to the AC network without power supply.

5. The method according to claim 4, wherein the adaptive voltage droop function increases an AC voltage reference signal with increasing reactive power.

6. The method according to claim 1, wherein the frequency is controlled via a phase-locked loop, wherein the phase-locked loop comprises an adaptive frequency droop function, and wherein the adaptive frequency droop function reacts on an active power measured at a connection point to the AC network without power supply.

7. The method according to claim 6, wherein the adaptive frequency droop function increases a frequency reference signal with increasing active power.

8. The method according to claim 1, wherein the method is applied to black start the AC network without power supply, wherein the AC network without power supply is connected via the HVDC system to one of at least two AC power stations and where the AC network without power supply is connected via transmission lines to another of at least two AC power stations, the method further comprising:

using the created AC bridge voltage to energize the transmission lines connected to the other of the at least two AC power stations; and starting the other of the at least two AC power stations.

9. The method according to claim 8, wherein the AC network without power supply is connected to more than two AC power stations and to at least one load, and wherein the AC network without power supply is restored by gradually starting a remainder of the AC power stations after the other of the at least two AC power stations was started and by afterwards connecting the at least one load.

10. An HVDC system connecting two AC networks, wherein a first of the two AC networks is without power supply and a second of the two AC networks is functioning, the HVDC system comprising:

two converter stations each comprising a voltage source converter and a control unit;

wherein the control unit of a first of the two converter stations which is connected to the AC network without power supply operates the corresponding voltage source converter as a voltage source generator by controlling the voltage source converter to create an AC bridge voltage with desired frequency and desired voltage amplitude using a direct AC voltage and frequency control by controlling a frequency and an amplitude of the AC bridge voltage, and wherein the control unit of the second of the two converter stations connected to the functioning AC network controls the corresponding voltage source converter to keep the DC voltage of the HVDC system in nominal value.

11. The method according to claim 1, wherein the method is only applied after detecting that second AC network is without power supply.

* * * * *